H. VANDERBEEK.
UNIVERSAL JOINT.
APPLICATION FILED APR. 29, 1908.
927,087.
Patented July 6, 1909.
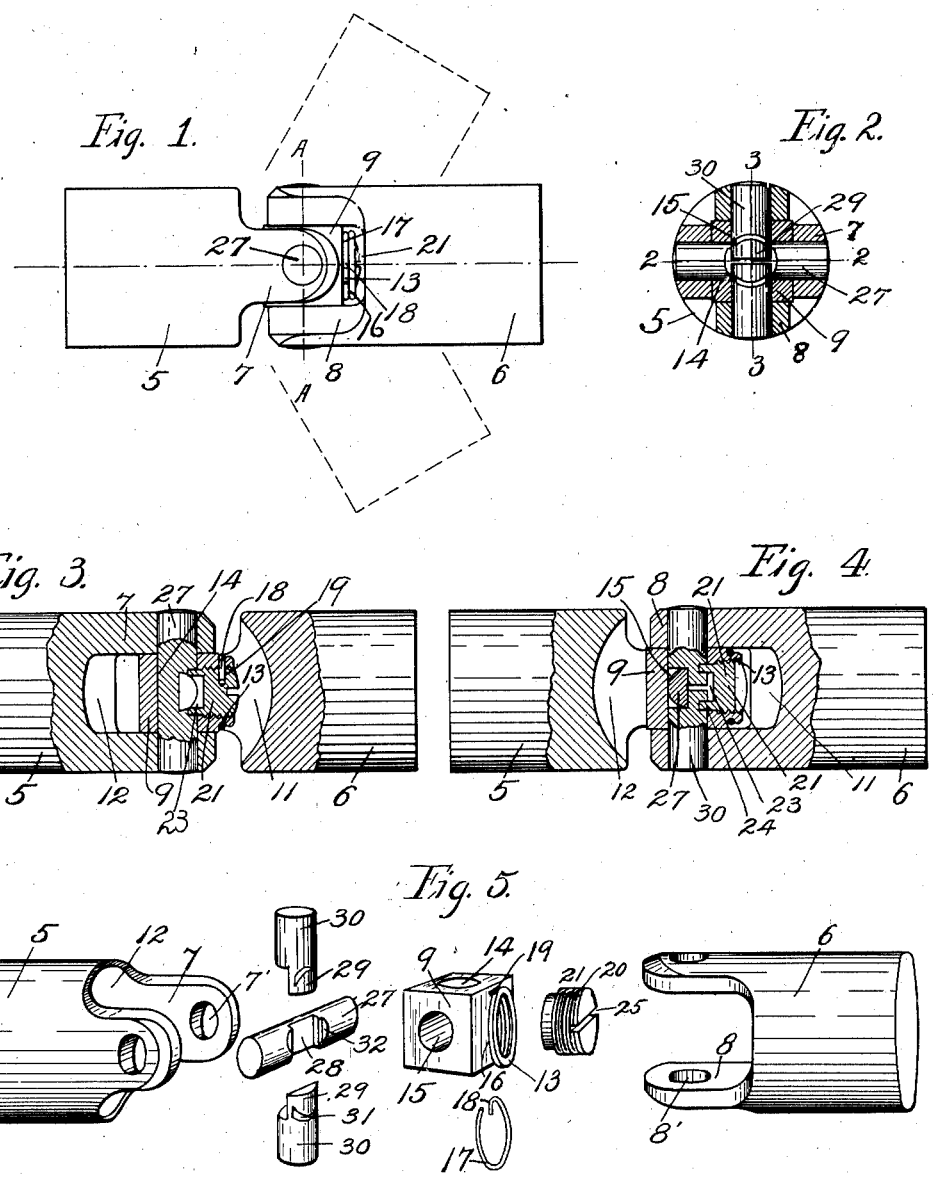

UNITED STATES PATENT OFFICE.

HERBERT VANDERBEEK, OF HARTFORD, CONNECTICUT.

UNIVERSAL JOINT.

No. 927,087.        Specification of Letters Patent.        Patented July 6, 1909.

Application filed April 29, 1908. Serial No. 429,815.

*To all whom it may concern:*

Be it known that I, HERBERT VANDERBEEK, a citizen of the United States, and a resident of Hartford, in the county of Hartford and State of Connecticut, have invented a new and Improved Universal Joint, of which the following is a specification.

My invention relates to the class of devices named, and the object of the invention is to provide a device of this class having numerous features of advantage and utility.

One form of device in the use of which these objects may be attained is illustrated in the accompanying drawings, in which—

Figure 1 is a side view of a joint embodying my invention. Fig. 2 is a view in transverse section through the device on a plane indicated by the line A—A of Fig. 1. Fig. 3 is a view partially in longitudinal section through the device on plane denoted by line 2—2 of Fig. 2. Fig. 4 is a view partially in longitudinal section through the device on a plane at right-angles to the plane of view of Fig. 3, and denoted by line 3—3 of Fig. 2. Fig. 5 illustrates the several parts disconnected but arranged to convey an idea of their final position.

In the accompanying drawings the numerals 5 and 6 denote coupling heads arranged to be operatively connected. These may form the ends of two shaft sections to be united by the joint, or may be constructed for attachment to each of the shaft sections, and may be of any desired form and material. Each of the heads or shaft sections have jaws 7 and 8 arranged to straddle a transmission block 9. The heads or ends of the shaft sections preferably have recesses 11 and 12 formed between the jaws, and while these recesses are not absolutely essential, yet they provide means for closely assembling the parts.

The transmission block is preferably constructed in generally cubical form and has a neck 13 with a threaded opening. Said block also has transverse pin holes 14 and 15. These holes are formed with their axes in the same plane and both extend completely through the block from side to side. A groove 16 is formed in the neck 13 for the reception of a retainer 17, which in the form herein shown is that of a spring having an end 18 adapted to be passed into a hole 19 in the groove 16 and also into a hole 20 in a lock 21.

The lock 21 is in the form of a screw having a recess 23 forming a lip 24 for a purpose to be hereinafter described. A slot 25 is formed in the lock as a means of turning it, this lock, as shown, being screw-threaded to fit the screw-threaded opening in the neck 13. It will be understood, however, that this form of engaging means between the lock and transmission block, and also the form of retainer for the lock are not essential, as various constructions accomplishing the desired result may be had without departing from the scope or intent of the invention.

Each of the jaws, 7 and 8 are provided with openings 7' 8' which form journal bearings for the portions of the pins projecting from the transmission block, and the jaws may be hardened to afford durable wearing surfaces with said pins, or this wearing surface may be provided in any other suitable manner. Interlocking connecting pins are employed for uniting the transmission block and each of the heads or ends of the shaft sections. These include a pin 27 which extends entirely through the transmission block 9, the ends of the pin resting within the openings in the jaws of one of the heads, as arranged herein, this pin engaging within the openings 7' in the head 5. A recess 28 is formed between the ends of the pin for the reception of the ends 29 of each of the sections of the coöperating pin 30.

The coöperating pin is formed in sections, the ends 29 of which nearly, if not quite, meet within the recess 28. Each of said sections is provided with means to receive the lip 24 on the lock 21, in the form of construction herein shown the sections 30 of one pin having grooves 31, and the recess 28 being enlarged as at 32.

It will be observed that my invention provides a joint in which the pins are so inserted that the parts may be easily and readily assembled, and that one of these pins extends entirely through the transmission block and into the jaws of the connected members. These pins are located in place against accidental removal, and any means for accomplishing this result may be employed, that herein shown proving to answer the requirements. By the method of interlocking said pins I prevent a radial displacement of pin 27 or a rotation, with relation to block 9, of said pin or of either section of the cooperating pin, and the lock 21 acts only as means to prevent the accidental radial displacement of sections of the coöperating pin.

While I have shown and described herein one pin extending completely through the transmission block and into the jaws such construction is not essential to the invention, as both of the pins may be sectional if desired. There being no particular strain upon the pins tending to remove them from their sockets, a lock having any means sufficient to retain them in position against accidental displacement will come within the intent of the invention.

I claim—

1. Two members having jaws, a single piece transmission block located between the jaws on each member, interlocking pins slidable in the block to connect the parts, one of said pins locking the other against endwise movement, and each of the pins securing the other against rotation with relation to said block, and means for retaining the pins in position.

2. Two members each having jaws, a single piece transmission block located between the jaws, pins of equal diameter located in said block and with their projecting ends engaging said jaws, said pins being slidable to permit assembling, and a lock projecting into the block, said parts having an interengaging lip and groove to prevent displacement of said pins.

3. Two members having jaws, a one-piece transmission block located between the jaws on each member, interlocking pins of equal diameter borne by said block and slidable to unite the connected members thereto, and a locking member for retaining a plural number of pins in position.

HERBERT VANDERBEEK.

Witnesses:
ARTHUR B. JENKINS,
L. E. BERKOVITCH.